Little & Westcott,

Hook.

No. 101,141.  Patented Mar. 22, 1870.

United States Patent Office.

SHERROD S. LITTLE AND HENRY P. WESTCOTT, OF MACON, GEORGIA, ASSIGNORS TO SMITH, WESTCOTT & CO., OF SAME PLACE.

Letters Patent No. 101,141, dated March 22, 1870.

IMPROVED HARNESS-FASTENING.

The Schedule referred to in these Letters Patent and making part of the same.

*To all whom it may concern:*

Be it known that we, SHERROD S. LITTLE and HENRY P. WESTCOTT, both of Macon, in the county of Bibb and State of Georgia, have invented a new and useful Improvement in Harness-Fastenings, of which the following is a full, clear, and exact description, reference being had to the accompanying drawing forming part of this specification, and in which—

Figure 1 represents a back-band hook and plate, constructed in accordance with our invention, and constituting the improvement in harness-fastenings herein referred to.

Similar letters of reference indicate corresponding parts.

Figure 1:
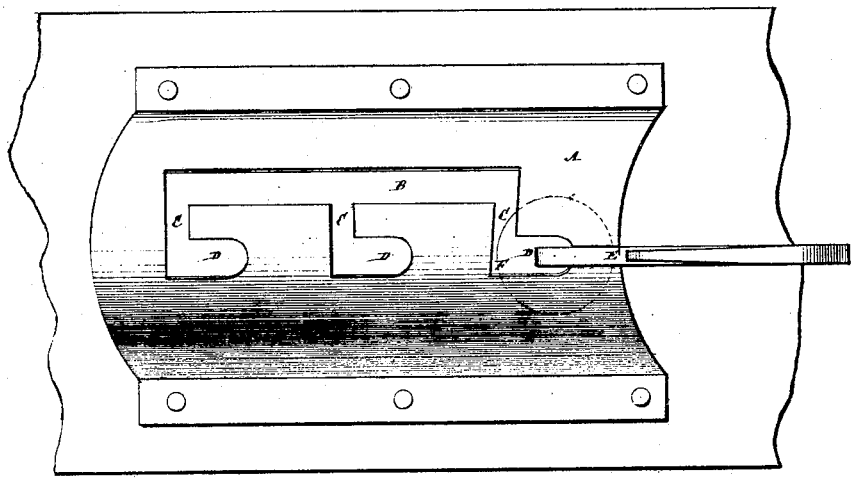
Figure 2:
Figure 2 is a longitudinal section of said plate.

Our improvement in harness-fastenings relates to what is known as the back-band hook, used for plowing; and The invention consists in a peculiar construction of the hook-plate whereby the hook is made adjustable, in such manner as that, without taking it out of the plate, the connection with the back-band can be shortened or lengthened to suit different-sized horses or mules, or to suit variable depths of plowing, that is, shallow or deep as the case may be, and so that, when the plow is hitched to run at a given depth, it may be readily changed to work at a different one without changing the back-band on the loins or forward to the shoulder of the animal; and The invention further consists in a peculiar or flat-shaped construction of the hook in combination with said plate, whereby the hook cannot be jerked out of position while plowing without turning it at right angles to or across the hook-plate.

Such improvement essentially differs from a hook-plate in which a hook of rounded form is used to fit within any one of a series of detached slots made in the raised portion of the plate, and whereby, to adjust the hook to different positions on the plate, it is necessary to take it out entirely from the plate, and afterward to reinsert it at its changed position, which is not only troublesome and inconvenient, but exposes the hook, by its removal from the plate, to being lost.

Referring to the accompanying drawing—

A is the hook-plate, made of raised or hollow belly form, and secured to the back-band in any suitable or the usual manner.

B is a longitudinal slot formed in said plate, and connecting, by narrow branch openings C, arranged at proper distance apart along the inner edge of the slot B, with a series of short longitudinal slots or openings, D, in the central or raised portion of the plate.

E is the hook, which is of flattened shape or construction, and of only slightly less thickness than the width of the branch openings C, at its shank-end, which terminates in a button, F, arranged to lie on the inside of the plate, and of larger dimensions than will admit of it passing out through the slots or openings in the plate.

To shift the hook from any one of the openings D to any other of them, so as to give to it a more forward or backward position on the plate, it is not necessary to take the hook out of the plate, but simply to turn and slide it in and along the branch openings C and general or connecting longitudinal slot B, and after the hook has been so adjusted or changed, its flat construction prevents it being jerked out of position, while plowing, without turning it at right angles to or across the hook-plate.

What is here claimed, and desired to be secured by Letters Patent, is—

1. The combination of the main longitudinal slot B with the branch openings C, and secondary longitudinal slots or springs D, in the plate A, for use in connection with a hook, adjustable in a locked manner or without being removed from said plate to different positions therein or along, substantially as specified.

2. The plate A, slotted as described, in combination with the adjustable hook E, when said hook is so constructed as not to be detachable therefrom, as set forth.

SHERROD S. LITTLE.
HENRY P. WESTCOTT.

Witnesses:
WM. J. SMITH,
GEO. L. ODUM.